US006985595B2

(12) United States Patent
Kohyama et al.

(10) Patent No.: US 6,985,595 B2

(45) Date of Patent: Jan. 10, 2006

(54) DEVICE, METHOD AND COMPUTER PROGRAM FOR DISPLAYING SIGNAL INFORMATION

(75) Inventors: Naohide Kohyama, Hamamatsu (JP); Hiroshi Hamamatsu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 226 days.

(21) Appl. No.: 10/189,317

(22) Filed: Jul. 2, 2002

(65) Prior Publication Data

US 2003/0007652 A1 Jan. 9, 2003

(30) Foreign Application Priority Data

Jul. 4, 2001 (JP) ............................ 2001-203346

(51) Int. Cl.
*H04B 1/00* (2006.01)
*G10H 7/00* (2006.01)

(52) U.S. Cl. ........................................ 381/119; 84/615

(58) Field of Classification Search ................ 381/119, 381/61; 700/94; 84/615, 645, 660, 625, 84/619; 369/3

See application file for complete search history.

(56) References Cited

U.S. PATENT DOCUMENTS

| | | | | |
|---|---|---|---|---|
| 5,608,807 | A | 3/1997 | Brunelle | 381/119 |
| 5,734,731 | A * | 3/1998 | Marx | 381/119 |
| 5,908,997 | A * | 6/1999 | Arnold et al. | 84/615 |

FOREIGN PATENT DOCUMENTS

| | | | |
|---|---|---|---|
| CN | 1213105 | A | 4/1999 |
| CN | 110143390 | | 5/1999 |

* cited by examiner

*Primary Examiner*—Laura A. Grier

(74) *Attorney, Agent, or Firm*—Morrison & Foerster LLP

(57) ABSTRACT

A mixing console has, for example, eight signal processing channels each for processing audio signals, and indicator units respectively for the signal processing channels. Each indicator unit is to display the channel number or the note name or another short message about the channel. Each channel is provided with a control element for commanding a control such as setting equalizer parameters. When a control element is actuated and held for more than one second, for example, such an actuation causes the designation of a channel about which a long message is displayed by using the indicator units for the eight channels in series.

6 Claims, 7 Drawing Sheets

Control Panel

*Fig. 1* Hardware Configuration of Mixing Console
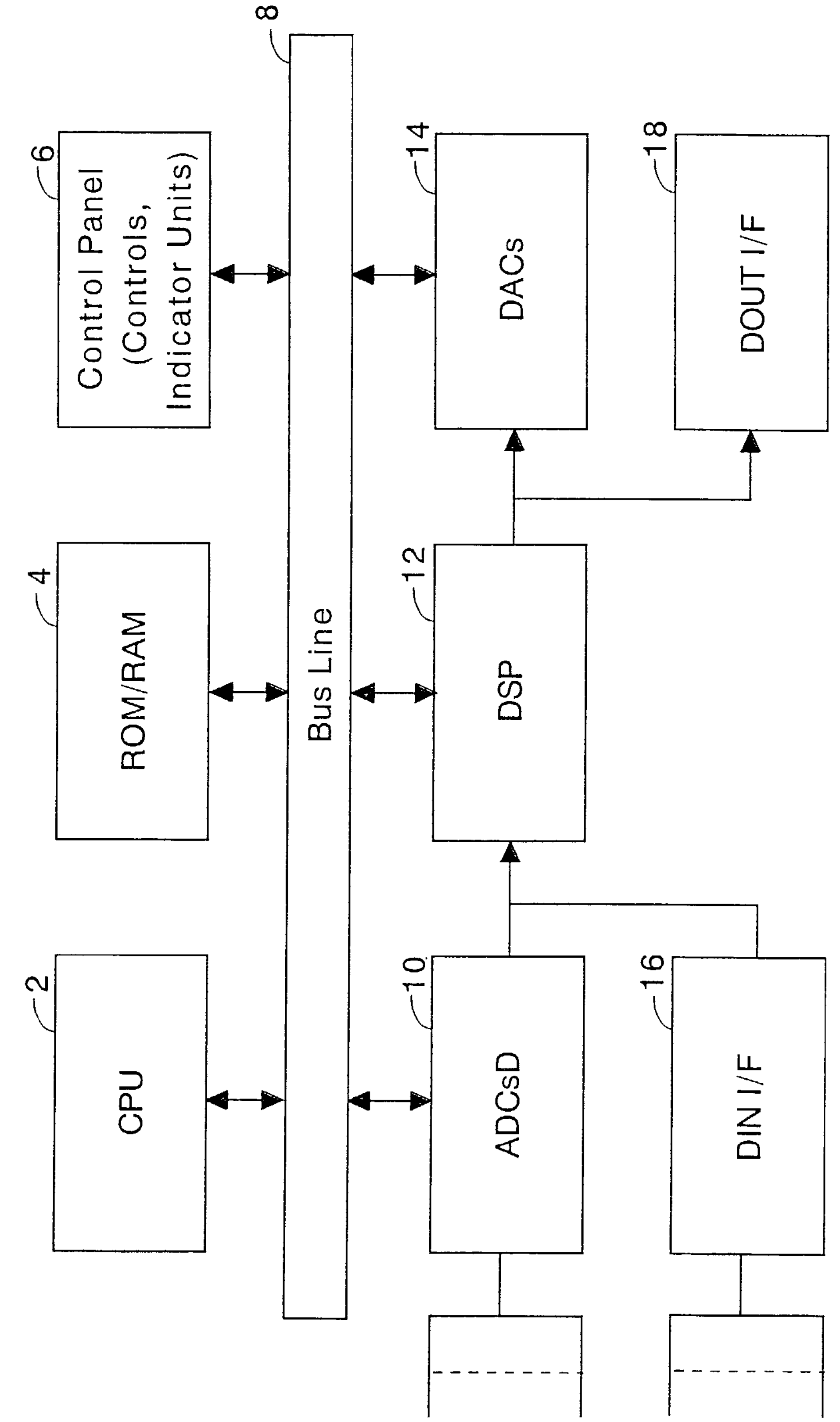

Fig.2 DSP Algorithm
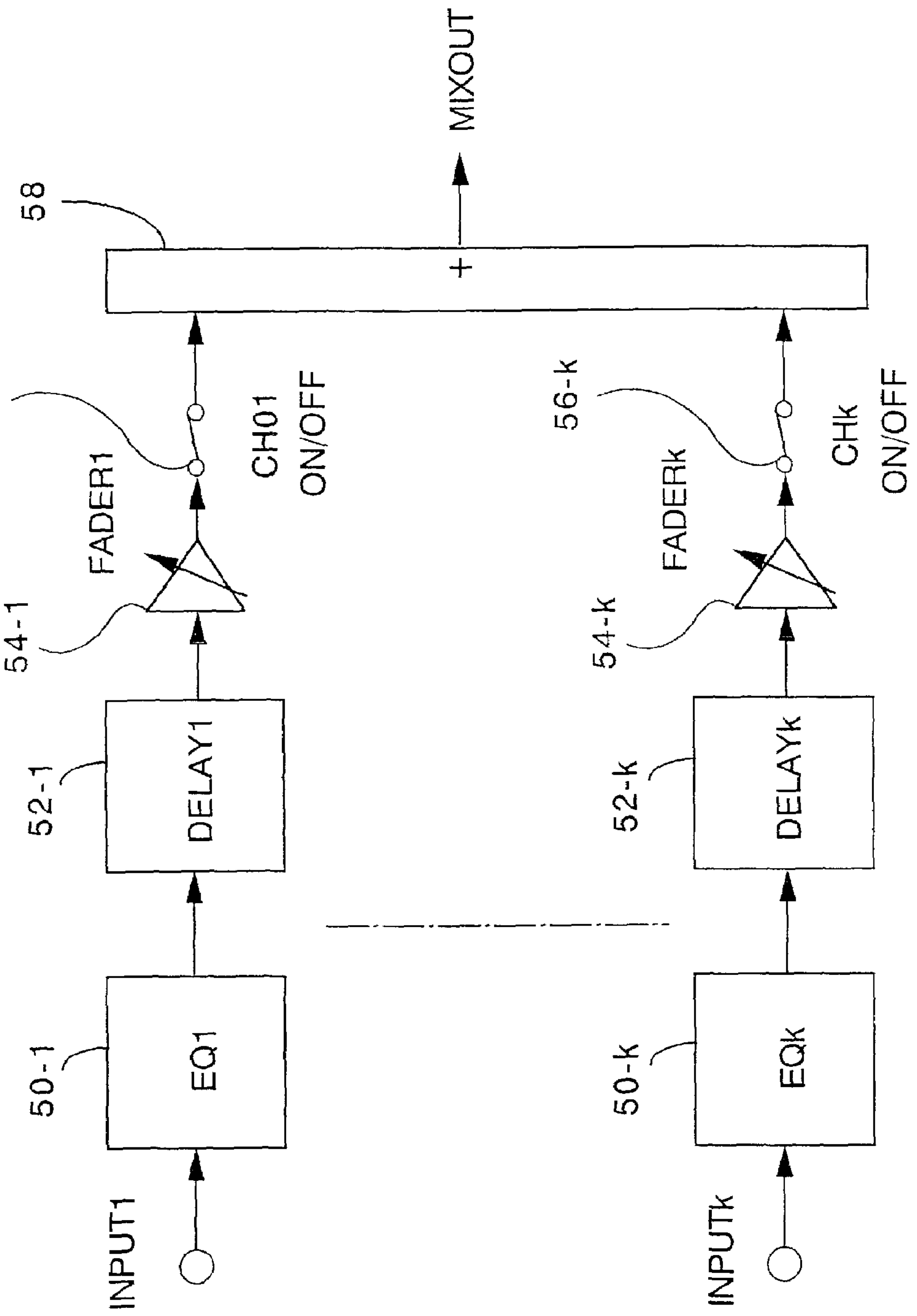

*Fig. 3* Parameter List
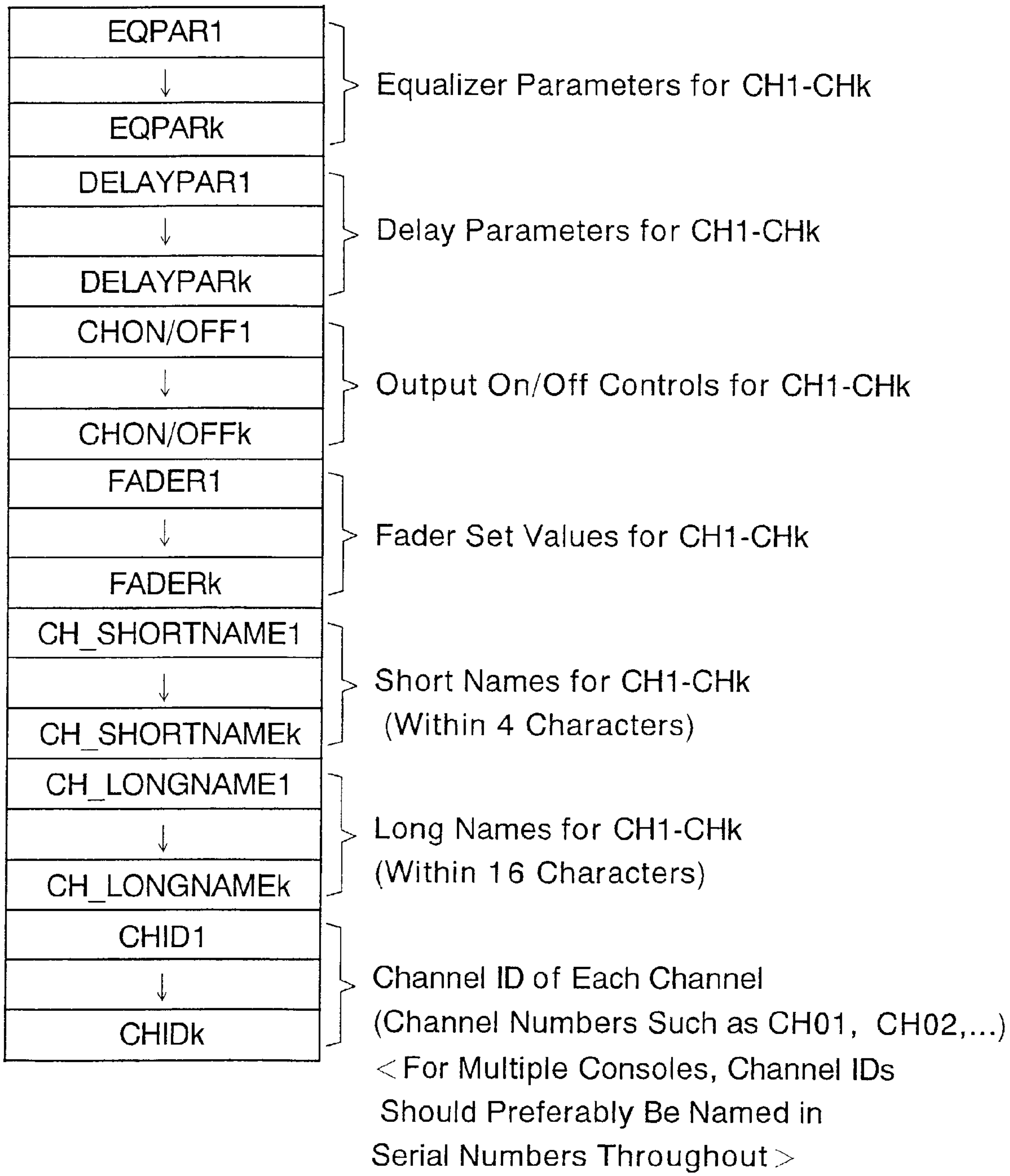

*Fig. 4* Main Program
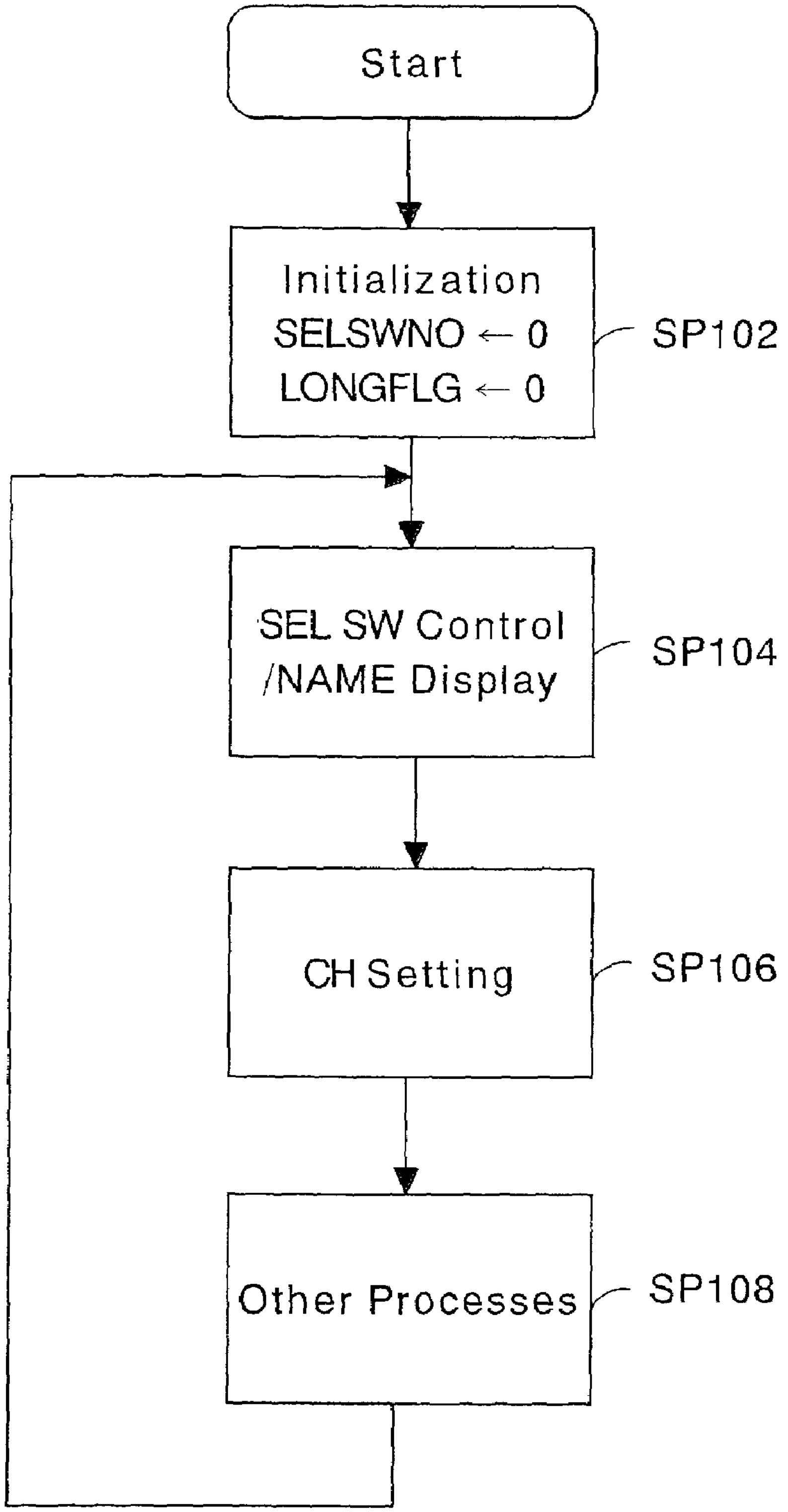

*Fig. 5* SEL Control/NAME Display
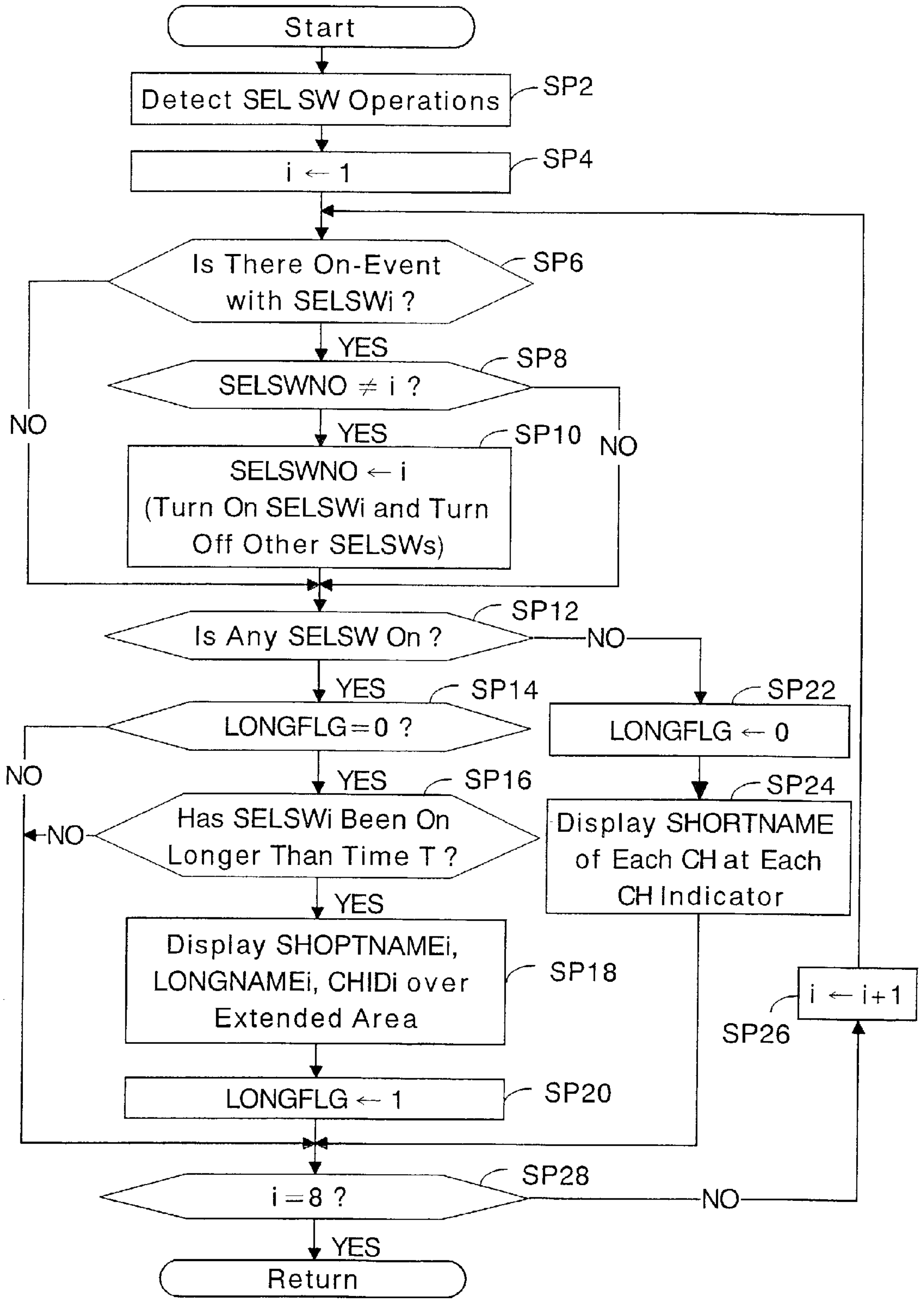

*Fig. 6* Control Panel
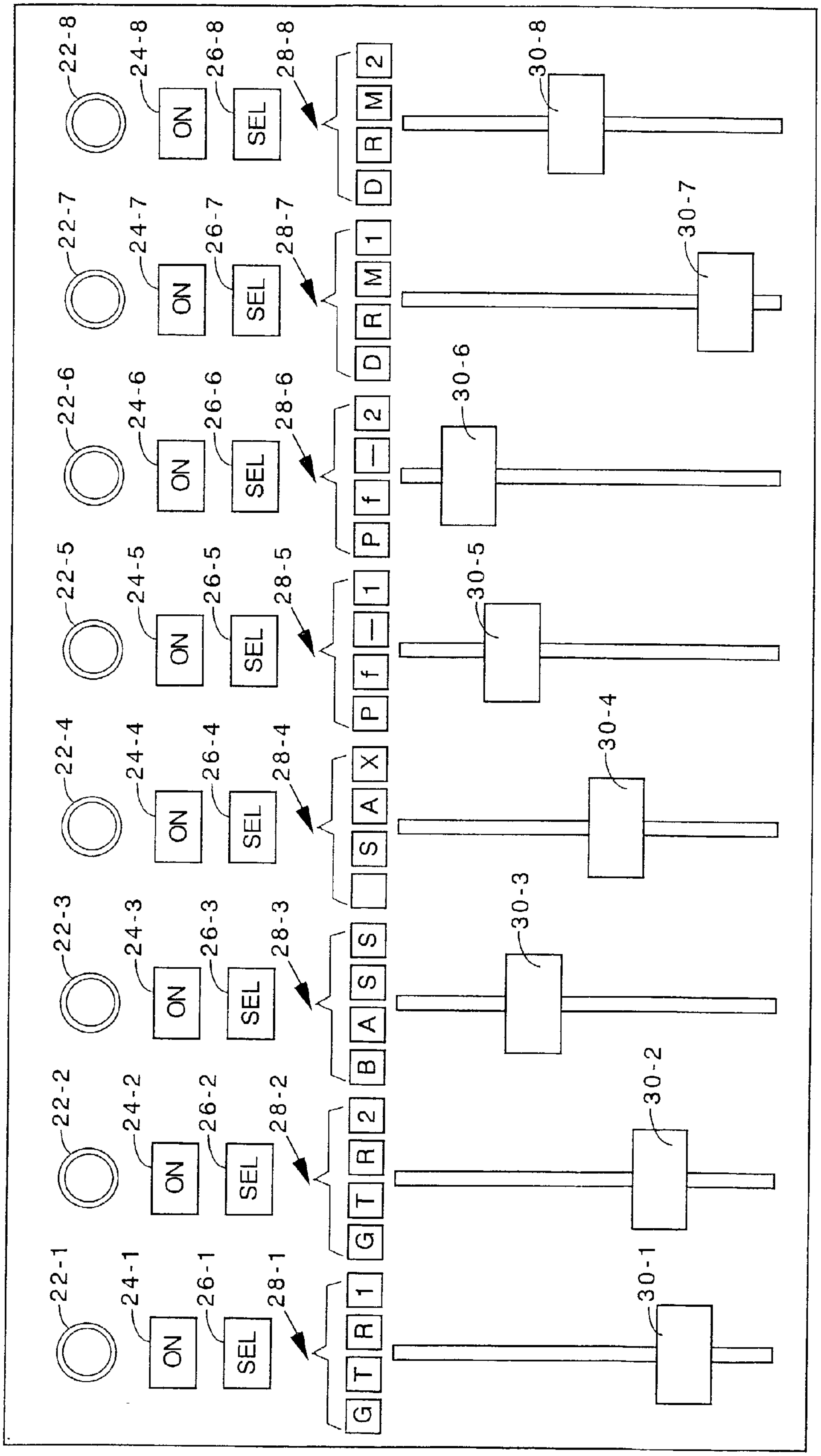

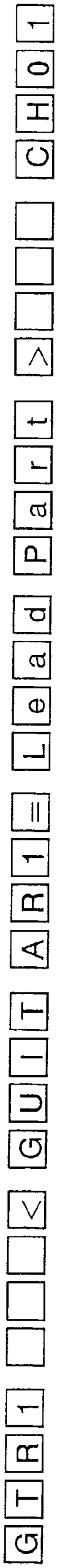
Fig. 7a Display Indication
Fig. 7b Display Indication

DEVICE, METHOD AND COMPUTER PROGRAM FOR DISPLAYING SIGNAL INFORMATION

BACKGROUND OF THE INVENTION

1. Field of the Invention

The present invention relates to a device, method and computer program for displaying signal information, and more particularly to a device, method and computer program suitable for use in a mixing console which has a plurality of signal processing channels, in which indicator units are provided in association with the respective signal processing channels and each indicator unit displays in a first display mode a simple indication of the information about each associated channel, while the indicator units in combination display in a second display mode a complex indication of the information about a particular channel as designated by a control element which is actuated in a particular operational manner.

2. Description of the Prior Art

A mixing console is to process a plurality of signals by means of a plurality of signal processing channels, controlling the signals in the respective channels individually and outputting a mixed output. The mixing console has a plurality of faders, each corresponding to each of the channels, for adjusting the signal level or other characteristics of the audio signal (including musical tones, human voices and other sounds) through each processing channel. Among the known mixing consoles, there is a type which is provided with indicator units, each near each of the faders, for displaying, with a character string, the channel identification number of each associated channel or a tone name, a musical instrument name and so forth of the signal being processed through the channel.

On the mixing console, however, the area allotted to and available for each channel is too narrow to display a sufficient length of character string for enough information. In this connection, the information about a tone name or else is given by a simple indication with a shortened expression using three or four characters. It will of course be possible to employ indicator units having narrow character display elements so that more characters can be displayed within the limited area for each channel, but such a solution will raise another demerit of poor legibility.

SUMMARY OF THE INVENTION

It is, therefore, a primary object of the present invention to solve the above described drawbacks with the conventional mixing console or other apparatuses having channel indicators and to present a novel type of device, method and computer program for displaying signal information, which is capable of displaying more detailed information about a channel of concern using a plurality of indicator units in combination to ensure good legibility.

According to the present invention, the object is accomplished by providing a signal information display device for use in an apparatus having a plurality of signal processing channels each for processing signals, the display device comprising: a plurality of indicator units respectively provided in association with the signal processing channels; a plurality of control elements (such as selector switches) respectively provided in association with the signal processing channels; and a display control device which controls the indicator units, in a first display mode, to display a simple indication of information (e.g. a short name or a channel identification number) about each associated signal processing channel using each of the indicator units, and, in a second display mode, to display a complex indication of information (e.g. a channel short name +a channel long name+a channel identification number) about a signal processing channel which is designated by the control element associated with the signal processing channel according to a predetermined particular operation of the control element, the complex indication being an indication using the plurality of indicator units.

In an aspect of the present invention, the signal information display device may be characterized in that each of the control element is to command a control (e.g. selection of a channel of which the equalizer parameters are to be set) for the associated signal processing channel, and the predetermined particular operation of the control element is to keep actuating the control element for more than a predetermined period of time (e.g. one second).

In another aspect of the present invention, the signal information display device may be characterized in that the signals processed by the signal processing channels are audio signals; the signal information display device further comprises fader units, each of which is provided in each of the signal processing channels for adjusting a level of the audio signal; and the control elements are for designating a signal processing channel of which a tone quality of the audio signal is adjusted (e.g. by setting equalizer parameters), from among the plurality of signal processing channels.

According to the present invention, the object is further accomplished by providing a method for displaying signal information on an apparatus having a plurality of signal processing channels each for processing signals, a plurality of indicator units respectively provided in association with the signal processing channel, and a plurality of control elements respectively provided in association with the signal processing channel, the method comprising: a step of controlling the indicator units, in a first display mode, to display a simple indication of information about each associated signal processing channel using each of the indicator units; a step of designating one of the signal processing channels by operating the control element associated with the one signal processing channel in a predetermined particular manner; and a step of controlling the indicator units, in a second display mode, to display a complex indication of information about the designated one signal processing channel using the plurality of indicator units.

In a further aspect of the present invention, the method for displaying signal information may be characterized in that each of the control element is to command a control for the associated signal processing channel, and the predetermined particular manner of operating the control element is to keep actuating the control element for more than a predetermined period of time.

In a still further aspect of the present invention, the method for displaying signal information may be characterized in that the signals processed by the signal processing channels are audio signals, and the method further comprises: a step of providing a fader unit in each of the signal processing channels for adjusting a level of the audio signal; a step of designating a signal processing channel of which a tone quality of the audio signal is to be adjusted among the plurality of signal processing channels; and a step of adjusting the tone quality of the audio signal as processed in the designated signal processing channel.

According to the present invention, the object is still further accomplished by providing a computer program containing program instructions executable by a computer and causing the computer to execute: a process of providing a plurality of signal processing channels each for processing signals; a process of providing a plurality of indicator units respectively in association with the signal processing channels; a process of providing a plurality of control elements respectively in association with the signal processing channel; a process of controlling the indicator units, in a first display mode, to display a simple indication of information about each associated signal processing channel using each of the indicator units; a step of designating one of the signal processing channels by operating the control element associated with the one signal processing channel in a predetermined particular manner; and a step of controlling the indicator units, in a second display mode, to display a complex indication of information about the designated one signal processing channel using the plurality of indicator units.

In a still further aspect of the present invention, the computer program may be characterized in that the process of providing a plurality of control elements is to provide each of the control element to be capable of commanding a control for the associated signal processing channel, and the predetermined particular manner of operating the control element is to keep actuating the control element for more than a predetermined period of time.

In a still further aspect of the present invention, the computer program may be characterized in that the signals processed by the signal processing channels are audio signals and that the program causes the computer further to execute: a process of providing a fader unit in each of the signal processing channels for adjusting a level of the audio signal; a process of designating a signal processing channel of which a tone quality of the audio signal is to be adjusted among the plurality of signal processing channels; and a process of adjusting the tone quality of the audio signal as processed in the designated signal processing channel.

As will be apparent from the description herein later, some of the structural element devices of the present invention are configured by a computer system performing the assigned functions according to the associated programs. They may of course be hardware structured discrete devices. Therefore, a hardware-structured device performing a certain function and a computer-configured arrangement performing the same function should be considered a same-named device or an equivalent to each other.

BRIEF DESCRIPTION OF THE DRAWINGS

For a better understanding of the present invention, and to show how the same may be practiced and will work, reference will now be made, by way of example, to the accompanying drawings, in which:

FIG. 1 is a block diagram illustrating a mixing console configured by a computer system, employing an embodiment of the present invention;

FIG. 2 is a block diagram illustrating an operational algorithm as performed in the digital signal processor in FIG. 1;

FIG. 3 is a chart showing the data structure of a parameter list used in the embodiment of FIG. 1;

FIG. 4 is a flow chart describing the main program executed in the embodiment of FIG. 1;

FIG. 5 is a flow chart describing the subprogram for select switch control and name display processing executed in the embodiment of FIG. 1;

FIG. 6 is a plan view of the control panel of the mixing console; and

FIGS. 7*a* and 7*b* are plan views of the indicator units in the control panel of FIG. 6.

DESCRIPTION OF THE PREFERRED EMBODIMENTS

Referring to the accompanying drawings, a preferred embodiment of the present invention will be described in detail hereinbelow. It should, however, be understood that the illustrated embodiment is intended just for a practical example and not for limiting the scope of the present invention, and that various modifications may be made without departing from the spirit of the present invention.

Hardware Configuration of the Preferred Embodiment

Overall Configuration:

With reference to FIG. 1, a description will be made hereinbelow about the overall configuration of a mixing console as an embodiment of the present invention. A central processing unit (CPU) 2 controls respective related parts in the mixing console via a bus line 8 according to the program, which will be described herein later. A memory 4 includes ROMs and RAMs, where the ROM stores the control program, etc. and the RAM is used as a working area memory for the CPU 2 and to store various setting parameters for the mixing console.

A control panel 6 includes a plurality of control elements and indicator units. The information signals about the respective actuations of the control elements are supplied to the CPU 2 via the bus line 8. The CPU 2 in turn supplies the information signals for the displays at the respective indicator units to the control panel 6 via the bus line 8. AD converters 10 are to convert analog audio signals (including tone signals, human or instrumental voice signals) of a plurality of channels supplied externally into digital audio signals. A digital input interface (DIN I/F) 16 converts digital audio signals of predetermined formats (AES/EBU, ADAT, TASCAM, etc.) supplied externally into digital signals of the internal format to be processed within the mixing console.

A digital signal processor (DSP) 12 performs mixing processing, effect imparting processing, etc. of the various audio signals to be processed in the mixing console. DA converters 14 are to convert the digital audio signals supplied from the DSP 12 into analog audio signals for a plurality of channels before outputting externally. A digital output interface (DOUT I/F) 18 converts the digital audio signals of the internal format supplied from the DSP 12 into digital audio signals of the above-mentioned predetermined external format before outputting externally.

Mixing Processing Algorithm:

Next, with reference to FIG. 2, a description will be made hereinbelow about the algorithm as performed in the DSP 12. The digital audio signals supplied from the AD converters 10 or from the digital input interface 16 are allotted to a plurality of input channels in the number of k, as shown by INPUT1 through INPUTk. Equalizers 50-1 through 50-k are provided for the respective signal processing channels (#1 through #k) to perform equalizing processing such as frequency characteristics modification on to the audio signals of the respective input channels. Delay blocks 52-1 through 52-k are to impart delay processing to the digital audio signals in the respective channels.

Fader blocks 54-1 through 54-k are to adjust the levels of the audio signals in the respective channels in accordance with the actuation amounts of the respective fader controls on the control panel 6 (to be described in detail herein later). On/off switches 56-1 through 56-k are to select whether to output the audio signals of the respective channels or not individually. An adder 58 is to add or combine the audio signals from the respective processing channels and outputs the result MIXOUT. The output signal MIXOUT from the adder 58 is supplied to the DA converters 14 and the digital output interface 18.

Parameters:

With reference to FIG. 3, a description will be made hereinbelow about various parameters stored in the memory 4. EQPAR1 through EQPARk are equalizer parameters for setting the conditions in the equalizers 50-1 through 50-k, respectively. DELAYPAR1 through DELAYPARk are delay parameters for setting the respective delay times in the respective delay blocks 52-1 through 52-k. CHON/OFF1 through CHON/OFFk are channel output on/off control flags for determining the on/off states of the respective on/off switches 56-1 through 56-k in the respective signal processing channels. FADER1 through FADERk are Fader set values for determining the respective fader coefficients (signal levels) of the respective fader blocks 54-1 through 54-k.

CH_SHORTNAME1 through CH_SHORTNAMEk are short names given to the respective signal processing channels #1 through #k and each consists of a character string with not more than four characters. CH_LONGNAME1 through CH_LONGNAMEk are long names given to the respective signal processing channels #1 through #k and each consists of a character string with not more than sixteen characters. CHID1 through CHIDk are channel identification number, and for example, the consecutive numbers "1" through "k" are given to the 1st through kth channels. In the case of multiple consoles connected together, the channel identification numbers CHIH1 through CHIDk are determined to be consecutive numbers throughout the entire channels.

Control Panel Configuration:

Now, with reference to FIG. 6, a description will be made hereunder about the configuration of the main area of the control panel 6. The mixing console of the present embodiment can be configured in multiple assemblies of a basic assembly consisting of eight signal processing channels, namely the number "k" of channels can be a multiple of "8". FIG. 6, therefore, shows the configuration of the control panel of such one assembly unit. Circular knobs 22-1 through 22-8 are attenuators which adjust the signal levels of the audio signals at the equalizers 50-1 through 50-k in the respective channels. Rectangular buttons 24-1 through 24-8 are toggle switches which change over from the "on" condition to the "off" condition and vice versa of the respective on/off switches 56-1 through 56-k, every time the button is pushed. Each switch button contains a lamp inside to indicate the "on" state and the "off" state of the switch by the lighting and the vanishing of the lamp, respectively.

Rectangular buttons 26-1 through 26-8 are selection switches to exclusively select one of the channels of which the equalizer (one of 50-1 through 50-k) is subject to parameter setting. Namely, when any one of the selection switches 26-1 through 26-8 is actuated, only the actuated switch button is lit, extinguishing the other switch buttons. The actuated switch keeps the "on" condition until another switch button is depressed.

As is known and conventional in the art, the control panel 6 further includes a sub-panel (not shown in FIG. 6) for adjusting various parameters to determine the characteristics of the equalizer 50-1 through 50-k so that the parameters of the equalizer (one of 50-1 through 50-k) of the channel of which the selection switch is on are ready to be set arbitrarily by the user. Indicator units 28-1 through 28-8 each are to display alphanumeric character strings each consisting of four or less characters. As an advantageous feature of the present invention, the indicator units, in combination, are available for displaying a complex indication for detailed information such as an indication of "a channel short name+a channel long name+a channel identification number" as shown in FIGS. 7*a* and 7*b* according to the processing as will be described in detail herein later.

FIGS. 7*a* and 7*b* show two examples of complex indication using eight indicator units. In either example, the indicator unit 28-1 displays the channel short name, the indicator unit 28-2 exhibits the symbol "<". The indicator units 28-3 through 28-6 show the channel long name consisting of up to sixteen characters, and the indicator unit 28-7 exhibits the symbol ">". Finally, the indicator 28-8 displays the channel identification number. Now back to FIG. 6, rectangular slide knobs 30-1 through 30-8 are fader controls, of each which the actuation amount determines the gain in the fader block 54-1 through 54-k (of FIG. 2).

Operation of the Preferred Embodiment

Main Program:

The operation of the embodiment will be described hereinbelow. When the power is turned on to the mixing console, the main program shown in FIG. 4 is started. As the program proceeds to a step SP102, the predetermined initialization processes take place. In this step, the selection switch number SELSWNO is set to be "0". The selection switch number SELSWNO is a variable representing a channel identification number (one of CHID1 through CHIDk) which is selected by a selection switch (one of 26-1 through 26-8), and a value "0" for this number means that none of the channels is selected. In this step SP102, the long name display flag LONGFLG is also set to be "0".

The long name display flag LONGFLG is set to be "1" in the case of a complex indication in which detailed information about one particular channel is displayed using the indicator units 28-1 through 28-8 for the eight signal processing channels as shown in FIGS. 7*a* and 7*b*, while it is set to be "0" in the case of simple indications in which only a channel short name or a channel identification number is displayed for each one of the eight channels using each indicator unit allotted to each of the channels as shown in FIG. 6.

Turning back to FIG. 4, as the program proceeds to a stop SP104, a subprogram for selection switch control and name display (FIG. 5) is started. This subprogram is to renew the contents to be displayed by the respective indicator units 28-1 through 28-8 according to the actuated states of the selection switches 26-1 through 26-8. As the program proceeds to a step SP106, a channel setting process executed, wherein the gains of the respective faders 54-1 through 54-8 are set according to the actuated amounts of the respective slide knobs 30-1 through 30-8, and the on/off conditions of the respective on/off switches 56-1 through 56-8 are set according to the actuations of the respective toggle switches 24-1 through 24-8. Further, the parameters for the equalizer block and the delay block of the channel under the selected condition are determined according to the actuated conditions in the parameter adjusting panel (not shown). As the program further proceeds to a step SP108, other various necessary processes are conducted. Thus, the routine from the step SP104 through SP108 are repeated in the main program.

Selection Switch Control & Name Display Subprogram:

Referring now to FIG. 5, a description will be made about the selection switch control/name display subprogram which is invoked at the step SP104 in the main program. This subprogram is invoked as a separate unit subprogram for every eight channels. For example, in the case of a mixing console having twenty-four channels, the subprogram executes three separate processes simultaneously. As the process moves forward to a step SP2 of FIG. 5, the operated conditions (on/off states) of the selection switches 26-1 through 26-8 are detected. And next at a step SP4, the variable "i" is set to be "1".

As the program further proceeds, a step SP6 judges whether there is an "on" event with respect to a selection switch 26-i (a selection switch 26-1 in the first cycle). More particularly, if the detection result at the step SP2 in the preceding run is "off" and the detection result at the step SP2 in the present run is "on ", the step SP6 judges that there is an "on" event. Assuming the case where there is an "on" event with the selection switch 26-1, the step SP6 judges "YES" and the process goes forward to a step SP8 to judge whether the selection switch number (variable SELSWNO) is other than the value "i".

As the selection switch number SELSWNO is set to be "0" at the initialization step SP102, the judgment at the step SP8 is "YES ", and the process moves to a step SP10. The step SP10 substitutes "i" ("1" in the first cycle) for the selection switch number SELSWNO. Thus, the selection switch button 26-i (i.e. 26-1 in this first cycle) is lit, and all other selection switch buttons are extinguished.

Next, the process goes forward to a step SP12 to judge whether any of the selection switches 26-1 through 26-8 are in the "on" state. Assuming now that the selection switch 26-1 is kept in a depressed state, the judgment is "YES" and the processes moves forward to a step SP14. The step SP14 judges whether the long name display flag LONGFLAG is "0". As the long name display flag LONGFLAG is set to be "0" at the initialization step, the judgment here is "YES" and the process proceeds to a step SP16.

The step SP16 judges whether the selection switch 26-i has been held in the "on" state for more than a predetermined period of time T (e.g. T=1 second). If the time T has not yet lapsed with the selection switch 26-i kept depressed, the judgment answer is "NO" and the process skips to a step SP28. The step SP28 judges whether the variable is now "8". If the variable "i" has not yet come to "8", the judgment is "NO" and the process goes to a step SP26 to increment the variable "i" by "1" before going back to the step SP6. Thus the processing by the steps SP6 through SP28 is repeated for variables i=2 through 8.

In the case where the selection switch 26-1 is kept depressed with other selection switches undepressed, the step SP6 judges "NO" under the variables i =2 through 8, the program skips to the step SP12. As the selection switch 26-1 is held depressed, the step SP12 judges "YES" and the process moves to the steps SP14 and SP16. As the selection switch for the variable i (i.e. any of 2 through 8) is not kept depressed, the step SP16 judges "NO" without fail. When the process goes to the step SP28 after the variable "i" has become "8", the step SP28 judges "YES" and the processing returns to the main program (FIG. 4).

Thereafter, the selection switch control/name display subprogram (FIG. 5) is invoked again while the selection switch 26-1 has been kept depressed longer than the predetermined duration T and the process comes to the step SP16 under the variable "i" set to be "1", the judgment here is now "YES ", and the process now goes to a step SP18. The step SP18 causes the indicator units 28-1 through 28-8 to display, for the variable "i" (which is now "1"), the short name CH_SHORTNAMEi, the long name CH_LONGNAMEi and the channel identification number CHIDi over the extended display area, that is, along the whole length of the eight indicator units as shown in FIG. 7*a* or 7*b*, as a complex indication of the information about the channel "i" (which is now "1"). Then the process goes to a step SP20 to set the long name display flag LONGFLG to be "1".

With the long name display flag LONGFLG set to be "1", the processing proceeds through the steps SP14 and SP16 and skips to the step SP28, as long as the selection switch 26-1 is kept depressed, and thus no substantial processing is executed by the present subprogram (FIG. 5). Thus, as long as the selection switch 26-i is kept depressed, the complex indication of the information consisting of the short name CH_SHORTNAMEi, the long name CH_LONGNAMEi and the channel identification number CHIDi about the channel "i" is displayed continuously for the variable "i" with which the step SP18 was executed for the last time.

Thereafter, as the selection switch 26-1 is released and the present subprogram is invoked again, the step SP 12 judges "NO" and the process goes to a step SP22. The step SP22 sets the long name display flag LONGFLG to be "0". As the process proceeds to a step SP24, the channel short names CH_SHORTNAME1 through CH_SHORTNAME8 are displayed on the indicator units 28-1 through 28-8, respectively, as simple indications of the information about the respective channels. Thus, the displayed contents on the control panel are brought back to the initial state.

As described hereinabove, the mixing console according to the present embodiment is capable of displaying a complex indication of the information about a channel which is designated by the user depressing the selection switch of the channel for longer than the predetermined duration T, the complex indication being an indication of the detailed information about the designated channel using the indicator units 28-1 through 28-8 for the eight channels. Thus, each of the indicator units 28-1 through 28-8 can employ display elements of a size of sufficient legibility (even though a few in number) to show details about the designated channel to the user.

Alternative Embodiments

The present invention is not necessarily limited to the above-described embodiment, but various modifications may be possible within the spirit of the invention, for example, as described in the following.

(1) According to the above embodiment, if any one of the selection switches 26-1 through 26-8 is kept depressed for more than a predetermined period of time, this actuation determines the contents of the complex indication using the indicators 28-1 through 28-8 (at the step SP 18), the displayed contents will not change as long as that depressed key is kept being depressed, even though any other selection switch is additionally depressed. But a modification is possible in the subprogram so that a complex indication for the channel of the last depressed selection switch (even though momentarily) shall be displayed using the eight indicators 28-1 through 28-8, as long as any of the selection switch is kept being depressed. According to such a modified embodiment, if any of the selection switches is depressed and held, and other selection switches are depressed one after another, then the detailed information about such channels as designated one after another can be confirmed by the complex indication, each in a short time.

(2) A further modification may be that the information contents to be displayed in a complex mode display such as the short name CH_SHORTNAMEi and the long name CH_LONGNAMEi should be arbitrarily inputted or set on the control panel 6 or by control elements or a computer connected externally. Further alternatively, various character strings or display patterns may be stored in a memory before hand, and any of such stored contents can be selected to be displayed.

As is apparent from the above description, the present invention provides an information display device and method, and also a computer program therefor, in which a predetermined particular operation of a channel control element among a plurality of channel control elements causes a plurality of indicator units respectively for a plurality of channels, as a whole, to display detailed information about the channel of which the channel control element is operated in the particular operational manner. Thus, the present invention can present to the user the detailed information about an arbitrary channel without deteriorating the legibility or visibility of the characters on the indicator units.

While several forms of the invention have been shown and described, other forms will be apparent to those skilled in the art without departing from the spirit of the invention. Therefore, it will be understood that the embodiments shown in the drawings and described above are merely for illustrative purposes, and are not intended to limit the scope of the invention, which is defined by the appended claims.

What is claimed is:

1. A signal processing apparatus comprising:

a plurality of signal processing channels, each for processing a signal;

a memory for storing a first type of name data items, each representing a string of letters of a first length indicative of each of said signal processing channels, and a second type of name data items, each representing a string of letters of a second length indicative of each of said signal processing channels, said second length being longer than said first length;

a plurality of channel units, each allotted to each of said signal processing channels, said channel units being aligned side by side in a control panel, each of said channel units including an indicator unit for displaying a string of letters in a limited length, at least one first control element for a control of the signal processing through the channel to which said each channel unit is allotted, and a second control element for selecting only the channel to which said each channel unit is allotted out of said plurality of signal processing channels a signal processing control device for controlling the signal processing through each of said signal processing channels according to the control of said first control element included in said each channel unit;

an indicator display control device for controlling said indicator units, in a first display mode, to display a simple indication of information about each signal processing channel using each of said indicator units based on each of said first type of name data items, and, in a second display mode, to display a detailed indication of information about one of said plurality of signal processing channel that is designated by the second control element included in the channel unit allotted thereto, said detailed indication being an indication using more than one of said plurality of indicator units based on said second type of name data items for said designated signal processing channel.

2. A signal processing apparatus according to claim 1, further comprising a parameter adjusting device for adjusting parameters for the signal processing through each of said signal processing channels, wherein, when said second control element included in the channel unit allotted to a first desired signal processing channel is kept actuated for more than a predetermined period of time, said first desired signal processing channel is designated for said detailed indication of information in said second display mode, and wherein, when said second control element included in the channel unit allotted to a second desired signal processing channel is actuated for less than a predetermined period of time, said second desired signal processing channel is designated as the signal processing channel of which said parameters for the signal processing are to be adjusted by said parameter adjusting device.

3. A method for, said method comprising:

a step of providing a plurality of signal processing channels, each for processing a signal;

a step of storing in a memory a first type of name data items, each representing a string of letters of a first length indicative of each of said signal processing channels, and a second type of name data items, each representing a string of letters of a second length indicative of each of said signal processing channels, said second length being longer than said first length;

a step of providing a plurality of channel units, each allotted to each of said signal processing channels, said channel units being aligned side by side in a control panel, each of said channel units including an indicator unit for displaying a string of letters in a limited length, at least one first control element for a control of the signal processing through the channel to which said each channel unit is allotted, and a second control element for selecting only the channel to which said each channel unit is allotted out of said plurality of signal processing channels;

a step of controlling the signal processing through each of said signal processing channels according to the control of said first control element included in said each channel unit;

a step of controlling said indicator units, in a first display mode, to display a simple indication of information about each signal processing channel using each of said indicator units based on each of said first type of name data items;

a step of designating one of said plurality of signal processing channels by said second control element included in the channel unit allotted thereto of; and a step of controlling said indicator units, in a second display mode, to display a detailed indication of information about said designated one of signal processing channels, said detailed indication being an indication using more than one of said plurality of indicator units based on said second type of name data item for said designated signal processing channel.

4. A method according to claim 3, further comprising a step for adjusting parameters for the signal processing through each of said signal processing channels, wherein, when said second control element included in the channel unit allotted to a first desired signal processing channel is kept actuated for more than a predetermined period of time, said first desired signal processing channel is designated for said detailed indication of information in said second display mode, and wherein, when said second control element included in the channel unit allotted to a second desired signal processing channel is actuated for less than a predetermined period of time, said second desired signal processing channel is designated as the signal processing channel of which said parameters for the signal processing are to be adjusted in said step for adjusting said parameters.

5. A computer readable medium containing executable instructions for causing a processor to perform a method for for processing signals, said method comprising the steps of:

providing a plurality of signal processing channels, each for processing a signal;

storing in a memory a first type of name data items, each representing a string of letters of a first length indicative of each of said signal processing channels, and a second type of name data items, each representing a string of letters of a second length indicative of each of said signal processing channels, said second length being longer than said first length;

providing a plurality of channel units, each allotted to each of said signal processing channels, said channel units being aligned side by side in a control panel, each of said channel units including an indicator unit for displaying a string of letters in a limited length, at least one first control element for a control of the signal processing through the channel to which said each channel unit is allotted, and a second control element for selecting only the channel to which said each channel unit is allotted out of said plurality of signal processing channels;

controlling the signal processing through each of said signal processing channels according to the control of said first control element included in said each channel unit;

controlling said indicator units, in a first display mode, to display a simple indication of information about each signal processing channel using each of said indicator units based on each of said first type of name data items;

designating one of said plurality of signal processing channels by said second control element included in the channel unit allotted thereto of; and controlling said indicator units, in a second display mode, to display a detailed indication of information about said designated one of signal processing channels, said detailed indication being an indication using more than one of said plurality of indicator units based on said second type of name data item for said designated signal processing channel.

6. A computer readable medium according to claim 5, wherein said method further comprises a step for adjusting parameters for the signal processing through each of said signal processing channels, wherein, when said second control element included in the channel unit allotted to a first desired signal processing channel is kept actuated for more than a predetermined period of time, said first desired signal processing channel is designated for said detailed indication of information in said second display mode, and wherein, when said second control element included in the channel unit allotted to a second desired signal processing channel is actuated for less than a predetermined period of time, said second desired signal processing channel is designated as the signal processing channel of which said parameters for the signal processing are to be adjusted in said step for adjusting said parameters.

* * * * *